Aug. 17, 1948.　　M. DE B. DE FOURCHAMBAULT　　2,447,319
FRICTION CLUTCH WITH MULTIPLE DISKS
Filed May 7, 1945　　　　　　　　　　　　　　　　2 Sheets-Sheet 1
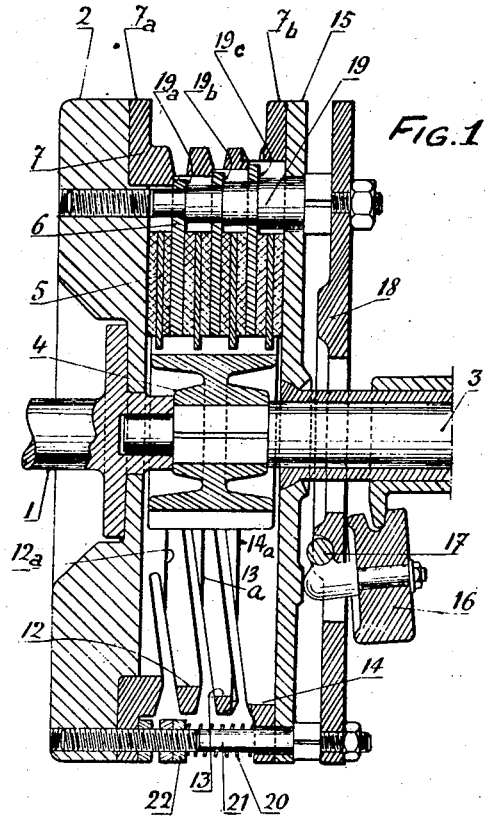
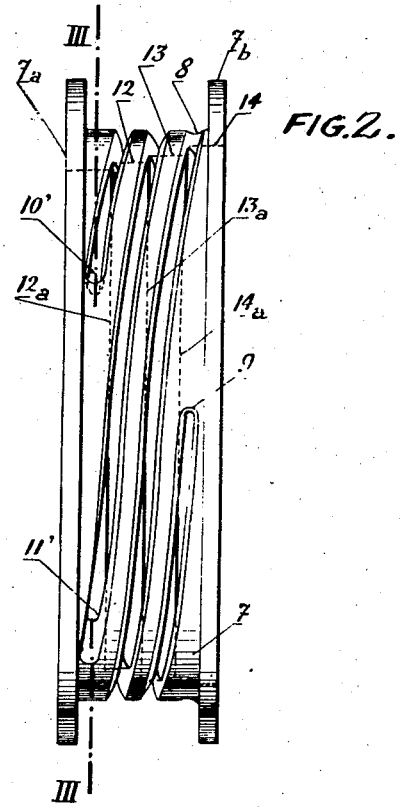
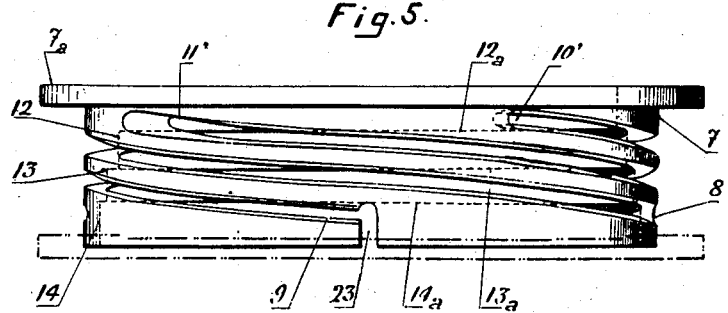
Inventor
MAURICE DE BORNIOL DE FOURCHAMBAULT
By Cameron, Kerkam & Sutton
Attorneys Aug. 17, 1948.   M. DE B. DE FOURCHAMBAULT   2,447,319
FRICTION CLUTCH WITH MULTIPLE DISKS
Filed May 7, 1945   2 Sheets-Sheet 2
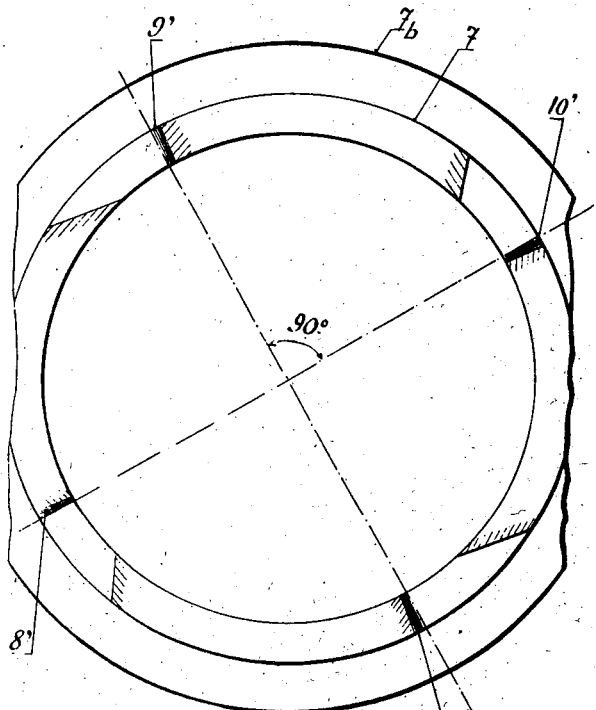
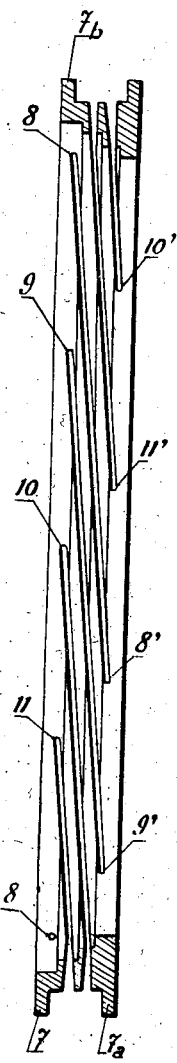
Inventor
MAURICE DE BORNIOL DE FOURCHAMBAULT
By Cameron, Kerkam & Sutton
Attorneys Patented Aug. 17, 1948

2,447,319

UNITED STATES PATENT OFFICE 2,447,319

FRICTION CLUTCH WITH MULTIPLE DISKS

Maurice de Borniol de Fourchambault, Paris, France, assignor to Schneider & Cie, Paris, France, a joint-stock company of France Application May 7, 1945, Serial No. 592,296
In France March 22, 1944

11 Claims. (Cl. 192—69)

This invention relates to the well known type of multiple disc friction clutch which comprises two series of interleaved annular discs rotatable with the driving shaft and the driven shaft respectively, the driving of the discs rotatable with the driven shaft being obtained through the action of an axial pressure by which the discs of both series are applied and pressed against one another, all of said discs being axially movable for this purpose.

Clutches of this type possess the disadvantage that it is very difficult to obtain the instantaneous release of the various discs at the moment of the declutching so that not only is the complete disconnection of the driving and driven shafts not obtained instantaneously but, furthermore, during the declutching periods, owing to the contacts which subsist between the discs of both series and to the rubbing movements of great velocity arising therefrom, the discs are exposed to an untimely wear and to a prejudicial heating which it is attempted to reduce by various means.

In order to remedy this well known inconvenience numerous expedients have been suggested the object of which is to insure a regular distribution of the play between the various discs, as, for instance, intercalated springs, control rods actuated by the compression plate and the like.

It has also been suggested to mount the discs of one of the series, for instance the outer discs, on a ring of axial helical springs having an initial tension and located in grooves provided in the casing of the clutch so that any two consecutive discs of the same series are always separated by the same number of turns of said springs. It is apparent that these springs, the power of which is comparatively small, hinder the clutching in no way and, on the contrary, are immediately released as soon as the pressure which had effected the clutching has been relieved and thus instantaneously insure the spacing of all the discs of the series under consideration.

The present invention relates to a clutch with multiple discs in which the separation of the discs at the moment of the declutching is insured through a means which is based on the same general idea as that just described, but which can be carried out in a much more mechanical and much simpler manner while permitting a correct support of the discs over a large part of their peripheries.

To this end, and according to the invention, the cylindrical casing of the clutch which is fast, for instance, with the driving plate, is rendered elastic in the axial direction and the outer discs are mounted inside the said casing with their peripheries resting upon shoulders provided in the latter so that the clutching operation, that is to say the pressing of the discs against one another, also compresses the elastic casing. Conversely, during the declutching operation, the release of the pressure exerted on the discs and the casing permits the expansion of the latter and, consequently, the individual axial driving back of the various discs, thus automatically insuring the mutual spacing of the same.

According to one particular embodiment of the invention, the elastic casing is made from a hollow cylinder in the wall of which a certain number of parallel grooves in the form of helical elements are provided which extend through the whole thickness of the wall and the origins of which, as well as their extremities, are angularly shifted with respect to one another in one and the same plane perpendicular to the axis. Inside said casing cylindrical recesses are provided each of which forms an annular shoulder perpendicular to the axis for supporting one of the discs, said shoulders extending over the several threads which separate the various grooves in the planes of the shoulders. Preferably, in order to facilitate the assembly and disassembly of the discs, the cylindrical recesses are arranged in steps as are the discs themselves. The helical grooves may extend over only one part of the length of the casing cylinder, in which event the casing comprises at its extremities circumferentially continuous resting flanges. On the other hand, in order to permit the free deformation of the threads, it is also possible to free the threads from one another at the extremity of the casing adjacent to the compression plate by providing at the corresponding origin of each of the helical grooves a cut through the wall of the casing to the end thereof which leaves the groove open at the end under consideration.

In order to insure an equal distribution of the play between the discs in the declutching position the devices can be provided with spindles having stepped collars parallel to the axis which, while insuring the angular driving of the driving discs, limit the longitudinal displacement of said discs in that, when the discs are urged in an axial direction by the shoulders of the elastic casing, they are brought into contact with the corresponding collars of the said spindles.

Finally, in the application of the invention to an automatic clutch working under the action of centrifugal masses, the device can also comprise a spring adjusting device the action of which, being algebraically added to that of the elastic casing, permits of varying the clutching point, i. e., the speed and the power at which it is desired that the driving of the driven shaft should become effective.

In the appended drawing, which is intended to be exemplary only:

Figure 1 is an axial sectional view of a centrifugal clutch made according to the invention, in which sectional view the discs are not represented in the lower half of the figure.

Figure 2 is an elevational side view of the elastic cage forming the casing of the clutch of Figure 1, while Figure 3 is a cross-sectional view of the same taken on line III—III of Figure 2, and Figure 4 is a developed view thereof, on a reduced scale as compared with Figures 2 and 3, and as seen from the inside of the cage, the sectioned portions of said view showing the cross section of the cage in the plane at which the development begins and ends.

Figure 5 is a view similar to Figure 2 and represents another embodiment of the casing.

In said figures, 1 is the driving shaft on which is keyed the plate of flywheel 2, while 3 is the driven shaft on which the hub 4 is keyed.

As usual, the friction discs, formed of annular plates, are distributed in two series, viz: the inner discs 5 provided with their usual linings and supported by the receiving hub 4 in such a manner as to be rotatable therewith and also axially shiftable therealong, and the outer discs 6 each of which is inserted between two consecutive inner discs and which are fixed for rotation with the flywheel 2, but are arranged so that they can be shifted axially for effecting the clutching or the declutching.

But, according to the invention, instead of sliding freely in an axial direction, as the discs 5 do, while being simply guided, for instance by means of tenons, in suitable grooves provided in an ordinary casing, the discs 6 are mounted in a casing having a certain axial elasticity and which controls their longitudinal displacements.

In the present case the casing is formed from a hollow cylinder 7 provided with flanges 7a and 7b at its extremities, the flange 7a serving to secure the said casing to the flywheel 2.

The elasticity of said casing is insured by means of four flaring grooves 8—8′, 9—9′, 10—10′ and 11—11′ forming helical elements of the same pitch extending through the wall of the cylinder 7, the origins 8, 9, 10, 11 of the said grooves, as well as the extremities 8′, 9′, 10′, 11′, lying respectively in one and the same plane perpendicular to the axis and being displaced by 90° with respect to one another in said plane.

In the inner wall of this helically grooved cylinder are provided three cylindrical bores 12, 13, 14 having increasing diameters and limited, in the direction of the flywheel, by shoulders in the form of circular rings 12a, 13a, 14a respectively lying in planes at right angles to the axis of the cylinder.

It is in said bores and against said shoulders that the outer discs 6 are located, the diameters of which discs correspond to the increasing diameters of the bores respectively.

The control of the clutching and declutching is effected by means of a compression plate 15 fixed for rotation with the driving flywheel 2 but capable of axially sliding on the driven shaft 3 on which it is centered. Said plate rests with its inner face in contact with both the last of the driven discs 5 and the flange 7b of the elastic casing.

In the example shown the displacements of the compression plate 15 are insured in a known manner by means of centrifugal masses 16 pivotally secured at 17 on a counter-plate 18 fast with the flywheel 2, but it is obvious that the said displacements could be effected by means of springs or by any other means.

It is evident that when the driving shaft attains a predetermined speed of rotation, the centrifugal masses simultaneously insure the compression of the discs against one another and the compression of the elastic casing.

Conversely, when the speed of the driving shaft falls below the above mentioned speed the centrifugal masses free the plate 15 which returns to its initial position while effecting the declutching operation and, simultaneously, permitting the expansion of the elastic casing the shoulders of which then insure the instantaneous release of the discs.

Furthermore, the above described device can comprise spindles 19 secured to the flywheel 2 and, passing through suitable bores provided in the discs 6, constituting a usual driving hub for the angular driving of the latter. The spindles 19 also serve as supports for the guiding and rotation of the compression plate 15 as well as means for fixing the counter-plate 18 to the flywheel 2.

The said spindles also play a special part in this case, that is the part of a device for equalizing the mutual spacing of the outer discs in the declutching position.

For this purpose, the spindles 19 comprise collars 19a, 19b, 19c arranged in steps at suitably chosen points of their length and the bores provided in the discs 6 for said spindles have diameters which increase in a corresponding manner. It is apparent from this construction that at the moment of the declutching the various discs 6 are applied against their respective collars under the action of the expansion of the elastic casing, which insures them an invariable position during the whole duration of the declutching operation.

Finally, Figure 1 shows, in its lower part, one of the elements of the above mentioned spring adjusting device which permits of varying the clutching point.

Said element is formed of a spring 20 mounted on a spindle 21 which is threaded into the flywheel 2 and supports the compression plate 15 as well as the counter-plate 18, exactly in the same manner as the stepped spindles 19. One end of the spring 20 thrusts against the plate 15 and exerts on the latter a pressure which can be adjusted by means of a nut 22 threaded on the spindle 21 against which the other end of the spring abuts. It will be understood, of course, that the whole device comprises a plurality of elements of this kind.

Although in the example shown the springs 20 are compression springs, it will be obvious that tension springs could be used, or that the compression springs could be arranged between the plates 15 and 18. In any event, the device is so arranged that the action of said springs is added algebraically to that of the elastic casing.

In the modification shown in Figure 5 the elastic casing differs from the casing shown in Figure 2 in that the helical grooves are cut through to and open at the end of the casing which contacts the compression plate, instead of terminating at a certain distance from the said end. As shown in the figure, there is no flange 7b on the casing and the origin 8, 9, 10, 11 respectively of every one of the grooves opens through a notch 23 at the free end of the cage, which end is preferably inserted in an annular groove provided in the compression plate 15. In this manner, the ends of the threads formed between the grooves are separated from one another, which increases the elasticity of the cage.

It will be understood that the device which has been described and which is shown in the appended drawing is susceptible of numerous modifications.

First of all, in the case of a clutch comprising a large number of discs wherein the stepped arrangement thereof would lead to considerable differences in cross section between the various threads, the latter could be cut in a frusto-conical ring so that all the turns would have nearly the same flexibility.

Another solution would consist in doing away with the stepped arrangement of the resting shoulders for the discs in the elastic casing, all the discs and shoulders having then the same diameter. The assembly and disassembly would then be effected by providing in the said shoulders suitable notches permitting the fixation of the discs by means of bayonet joints, said discs comprising, for this purpose, corresponding peripheral indentations.

Finally, it will be obvious to those skilled in the art that the mode of assembly of the discs on individual supports formed in an elastic holder submitted, like the discs themselves, to the action of the compression plate, could also, if the dimensions prescribed for the apparatus allow this arrangement, be applied to the inner discs by providing resting collars, stepped or non-stepped, perpendicular to the axis in the outer surface of a hub which, like the hub 4, would be fast with the driven shaft, but which would have been rendered elastic in the axial direction in any suitable manner.

I claim:

1. A friction clutch of the type comprising coaxial driving and driven elements and two series of friction clutch discs rotatable with said driving and driven elements respectively and capable of axial movement into frictional clutching engagement with one another, characterized by the inclusion of an annular disc separating member coaxial with said driving and driven elements and elastically deformable in an axial direction, said member being connected at one end to one of said driving and driven elements for rotation therewith and having shoulders formed thereon at axial spaced intervals against which rest the discs of one of said series, and means for applying clutch engaging force to said discs, said means being so constructed and arranged as to apply force to the other end of said elastically deformable member simultaneously with the application of clutch engaging force to said discs.

2. A friction clutch according to claim 1 wherein the shoulder engaging peripheries of the discs which rest against the shoulders on said elastically deformable member and the cooperating shoulders are of progressively increasing diameter from one end of the clutch to the other.

3. A friction clutch according to claim 1 including means for insuring equal spacing of the discs when in declutched position comprising a plurality of spindles parallel to the axis of said driving and driven elements and having collars formed thereon at axially spaced intervals against which the discs resting against the shoulders on said elastically deformable member are adapted to be moved by said member when the clutch engaging force is discontinued.

4. A friction clutch according to claim 1 including means for insuring equal spacing of the discs when in declutched position comprising a plurality of spindles rotatable with and parallel to the axis of one of said driving and driven elements and having collars formed thereon at axially spaced intervals against which the discs resting against the shoulders on said elastically deformable member are adapted to be moved by said member when the clutch engaging force is discontinued, said last named discs having openings therein through which said spindles pass in such manner as to rotatably couple said discs to the element with which said spindles are rotatable.

5. A friction clutch of the type comprising coaxial driving and driven elements, two series of friction clutch discs rotatable with said driving and driven elements respectively and capable of axial movement relatively thereto, and centrifugally actuated means responsive to the speed of rotation of said driving element for applying clutch engaging force to said discs to move them into frictional clutching engagement with one another, characterized by the inclusion of an annular disc separating member coaxial with said driving and driven elements and elastically deformable in an axial direction, said member being connected at one end to one of said elements for rotation therewith and having shoulders formed thereon at axially spaced intervals against which rest the discs of one of said series, said centrifugally actuated means being so constructed and arranged as to apply compressing force to the other end of said member simultaneously with the application of clutch engaging force to said discs, and means for varying the force necessary to effect clutching action of said discs comprising spring means acting in conjunction with said elastically deformable member for opposing the clutch engaging force exerted by said centrifugally actuated means, and means for adjusting the force exerted by said spring means.

6. A friction clutch of the type comprising coaxial driving and driven elements and two series of friction clutch discs rotatable with said driving and driven elements respectively and capable of axial movement into frictional clutching engagement with one another, characterized by the inclusion of an annular disc separating cage coaxial with said driving and driven element and elastically compressible in an axial direction, said cage being connected at one end to said driving element for rotation therewith and having annular shoulders formed thereon at axially spaced intervals against which rest the discs of one of said series, and means for simultaneously applying clutch engaging force to said discs and compressing force to the other end of said cage.

7. A friction clutch according to claim 6 wherein the elastically compressible cage surrounds said discs and has the annular shoulders formed in its inner surface, said shoulders and the peripheries of the discs which rest thereagainst being of progressively increasing diameter from one end of the clutch to the other.

8. A friction clutch according to claim 6 wherein the elastically compressible cage consists of a hollow cylinder in the wall of which are formed a plurality of parallel, helical grooves separated by thread-like portions of said wall, the extremities of said grooves being circumferentially spaced from one another in planes perpendicular to the axis of the cage, said cage surrounding said discs and having the annular shoulders formed in its inner surface, each of said shoulders being perpendicular to the axis of said cage and extending over a plurality of the thread-like portions which separate said grooves.

9. A friction clutch according to claim 6 wherein the elastically compressible cage consists of a hollow cylinder in the wall of which are formed a plurality of parallel, helical grooves separated by thread-like portions of said wall, one extremity of each of said grooves lying in the plane of the end of the cage against which the compressing force is exerted, the thread-like portions of the wall being unconnected with one another circumferentially at said end of the cage.

10. A friction clutch according to claim 6 including means for insuring equal spacing of the discs when in declutched position comprising a plurality of spindles rotatable with and parallel to the axis of said driving element and having collars formed thereon at axially spaced intervals against which the driving clutch discs are adapted to be moved by the cage when the clutch engaging force is discontinued, said last-named discs having openings therein through which said spindles pass in such manner as to rotatably couple said discs to the driving element.

11. A friction clutch of the type comprising coaxial driving and driven elements, two series of friction clutch discs rotatable with said driving and driven elements respectively and capable of axial movement relatively thereto, and centrifugally actuated means responsive to the speed of rotation of said driving element for applying clutch engaging force to said discs to move them into clutching engagement with one another, characterized by the inclusion of an annular disc separating cage coaxial with said driving and driven elements and elastically compressible in an axial direction, said cage being connected at one end to said driving element for rotation therewith and having annular shoulders thereon at axially spaced intervals against which rest the discs of one of said series, said centrifugally actuated means being so constructed and arranged as to apply compressing force to the other end of said cage simultaneously with the application of clutch engaging force to said discs, and means for varying the force necessary to effect clutching action of said discs comprising a plurality of springs arranged parallel to the axis of said axially compressible cage and acting in conjunction therewith for opposing the clutch engaging force exerted by said centrifugally actuated means, and means for adjusting the force exerted by said springs.

MAURICE DE BORNIOL DE FOURCHAMBAULT.

REFERENCES CITED

The following references are of record in the file of this patent:

UNITED STATES PATENTS

| Number | Name | Date |
| --- | --- | --- |
| 1,519,316 | Larsh | Dec. 16, 1924 |
| 2,057,876 | Berry | Oct. 20, 1936 |
| 2,091,268 | Colman | Aug. 31, 1937 |